(No Model.) 3 Sheets—Sheet 1.

W. H. H. STEVENSON.
CAN SOLDERING MACHINE.

No. 366,271. Patented July 12, 1887.

Witnesses:
Wilson Ringle
B. F. Boyden

Inventor:
Wm. H. H. Stevenson
By G. H. Boyden atty.

(No Model.)  3 Sheets—Sheet 2.

W. H. H. STEVENSON.
CAN SOLDERING MACHINE.

No. 366,271. Patented July 12, 1887.

Witnesses:　　　　　　　　　　　Inventor:

(No Model.) 3 Sheets—Sheet 3.
W. H. H. STEVENSON.
CAN SOLDERING MACHINE.
No. 366,271. Patented July 12, 1887.
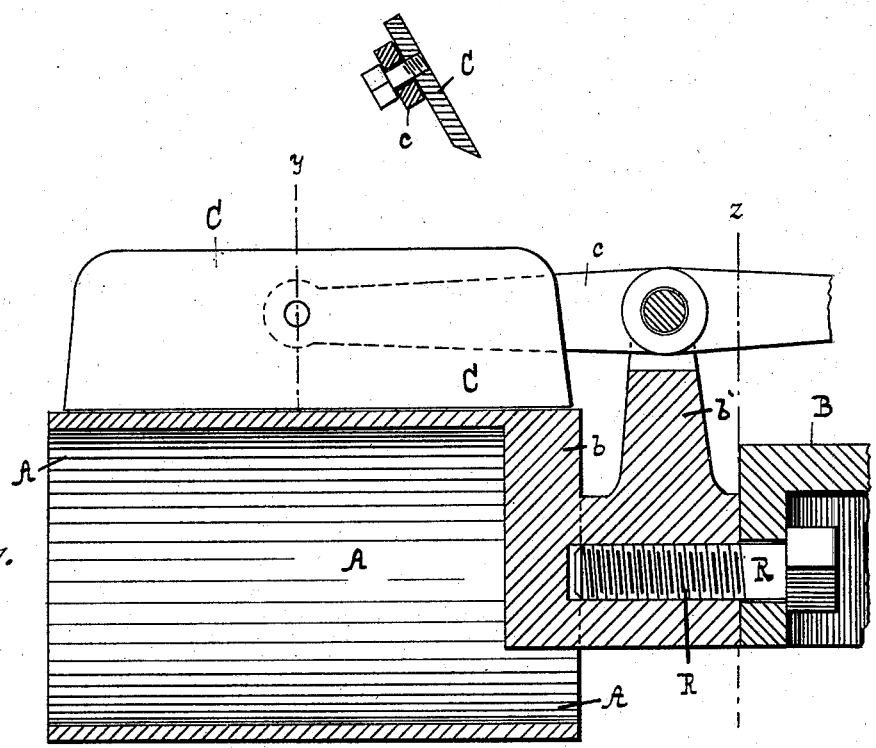

United States Patent Office.

WILLIAM H. H. STEVENSON, OF BALTIMORE, MARYLAND, ASSIGNOR TO THE BALTIMORE CAN MANUFACTURING COMPANY, OF SAME PLACE.

CAN-SOLDERING MACHINE.

SPECIFICATION forming part of Letters Patent No. 366,271, dated July 12, 1887.

Application filed December 18, 1885. Serial No. 186,079. (No model.)

*To all whom it may concern:*

Be it known that I, WILLIAM H. H. STEVENSON, a citizen of the United States, residing at Baltimore, in the State of Maryland, have invented certain new and useful Improvements in Can-Soldering Machines, of which the following is a specification, reference being had therein to the accompanying drawings.

My invention relates to improvements in can-soldering machines in which the side seams of cans are soldered; and it consists of means to gage and clamp the can-body; and also means to carry the gaging devices in a circle, whereby they are brought *seriatim* to the operator to be soldered, as illustrated in the accompanying drawings, in which—

Figure 1:
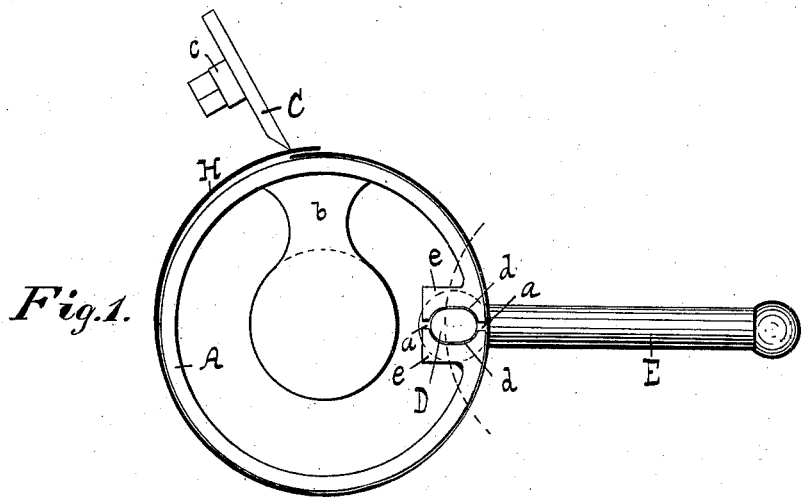
Figure 2:
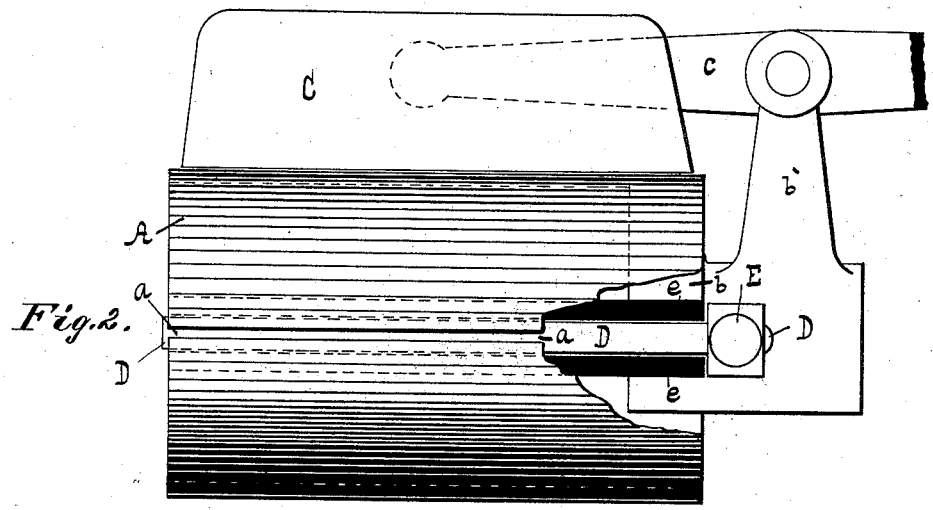
Figure 3:
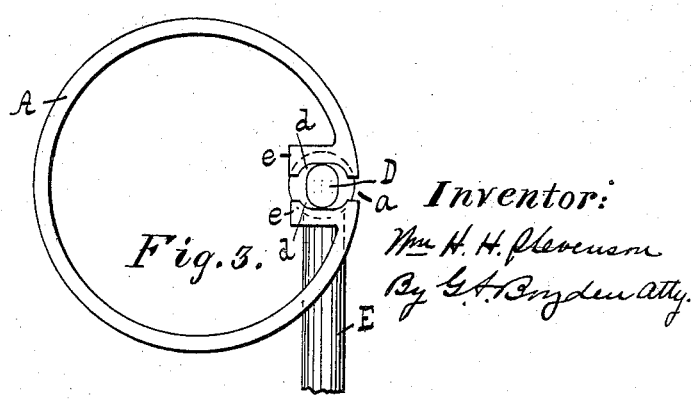
Figure 4:
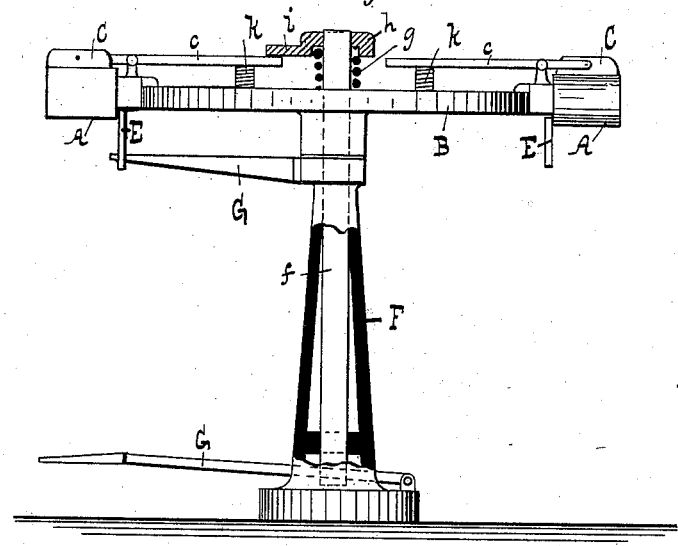
Figure 5:
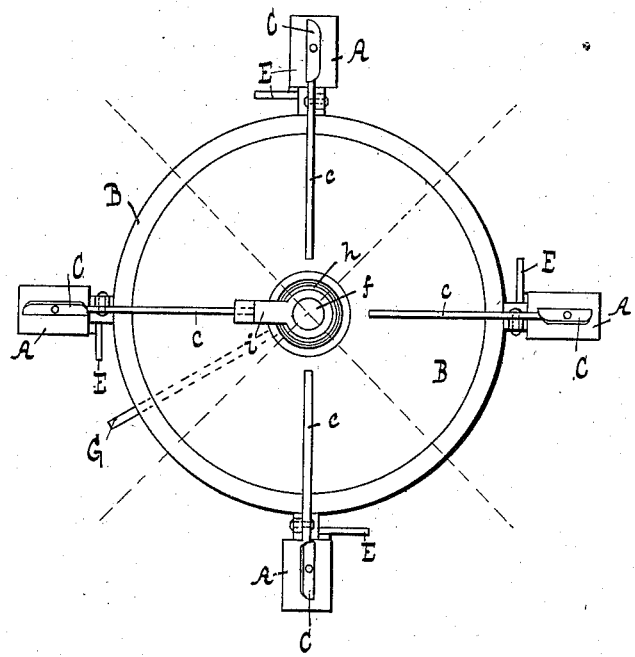

Figure 1 is an end view of the gaging-cylinder. Fig. 2 is a side view of the same with parts broken away on line $x$. Fig. 3 is an end view showing the cylinder expanded. Fig. 4 is a side elevation of the machine. Fig. 5 is a top view of the machine; Fig. 6, a sectional view of the clamping-knife on line $y$, showing how it is secured to the lever; Fig. 7, a diametrical section view of the cylinder, showing the construction of the same and how it is secured to the rotary table; Fig. 8, a detail view on line $z$, showing how the lever is pivoted to the arm $b'$.

Similar letters refer to similar parts throughout the views.

The gaging device shown in Figs. 1, 2, 3, and 7 consists of a metallic cylinder, A, of a thickness to be slightly elastic, and slotted longitudinally at $a$ to permit its diameter to be varied by increasing or diminishing the size of the said slot, thereby determining the size of the can-body accordingly. The cylinder A, as herein shown, is cast integral with the arm $b$, by which it is supported at one point, thus permitting the other portion to expand or contract. The arm $b$ is formed with a projecting hub, by which the cylinder is attached to the ordinary work-bench or to the rotary carrier B by means of the screw R, which is threaded into the hub, and, as shown in Fig. 7, clamps it against the downward-projecting flange of the carrier B, thus securely holding the two together. From the hub on the arm $b$ projects the arm $b'$, which is slotted at the top to receive the lever $c$, and, as shown in Fig. 7, placed at an angle to correspond with the angle of the knife C, but which is not necessary, as it may be varied as desired. The lever $c$ is arranged to govern the clamping-knife C either by treadle or machine, (shown as mounted on the rotary carrier,) and is pivoted to the arm $b'$, by which the knife C is raised and lowered, and to the clamping-knife, so that its edge is properly seated on the can-body its entire length, thereby firmly holding the said can-body against the cylinder at that point to be gaged by expanding the cylinder, and then held in the clamped position until soldered.

The cylinder is expanded by the oval rod D, which is placed in the grooves $d$ of the lugs $e$, cast integral with the cylinder A. By partly turning the oval rod on its axis, which places its greater diameter at right angles to the position previously occupied, the cylinder is expanded. (See Fig. 3.)

To operate the rod D, I attach to one end of it the handle E, which, when the cylinder is to be contracted, is placed in a horizontal plane, and when the cylinder is to be expanded is turned at right angles from the horizontal position, either up or down.

As shown in Figs. 4 and 5, the gaging-cylinder A is mounted on the rotary carrier B, which facilitates the production, as the can-body blank is placed on the cylinder and gaged by a "helper," after which it is soldered by the operator at a different place from where it is placed on, &c.

The carrier B is supported on the frame F and permitted to rotate freely thereon and around the central shaft, $f$, and its movement controlled by the operator, who, when one body is "seamed," partly turns the carrier, which places the following one in position to be likewise seamed. The shaft $f$ is arranged to vertically reciprocate, and is actuated by means of the treadle G, which is pivoted to the frame and extends through a slot in the shaft and frame, by which, when it is depressed, the shaft $f$ is drawn down, and when released the shaft is raised by the spring $g$, placed between the carrier B and collar $h$. From the collar $h$ projects the arm $i$, which depresses the end of the lever $c$ immediately under it when the treadle is actuated, thereby raising the clamping-knife and permitting a can-body to be placed or removed. The knife C presses against the can-body and holds it by the spring k.

As shown in Fig. 5, the carrier is provided with four gaging-cylinders, but eight or more may be used. The dotted lines indicate their position.

In case it is desirable to expand the cylinders automatically, I arrange them, as shown in Figs. 4 and 5, with the slot at the lower side of the cylinder, by which the handles are operated by coming in contact with the arm G as the carrier is rotated, which expands the cylinder automatically after the bodies have been placed thereon, at which time the said handles are in a position of forty-five degrees from a horizontal plane, and which are moved ninety degrees, or placed at right angles to their former position, by coming in contact with the arm G, as above stated.

In operating the machine the helper first depresses the treadle, which raises the clamping-knife on the cylinder immediately over the treadle, and then places a can-body tightly around that cylinder, with the seam in the proper relation to the clamping-knife, which is then permitted to clamp the body H by releasing the treadle. The handle E is then placed at right angles from the horizontal position, which expands the cylinder, and the can-body, previously being tightly placed around it, is expanded therewith and gaged accordingly, which is permitted by the underlapped edge of the same being partly withdrawn from under the other edge, which is held in its position by the sharp edge of the clamping-knife. The carrier is then partly rotated and another body likewise placed on the following cylinder. The soldering is accomplished by the operator, standing at right angles from the helper, with a hand-copper, in the usual manner.

Having described my invention, I claim and desire to secure by Letters Patent of the United States—

1. In a can soldering machine, the combination of the rotary carrier B, the split cylinder A, the clamping-knife C, the handle E, the rod D, the arm G, the reciprocating shaft $f$, arranged to raise the knife C, and the treadle mechanism, for the purpose set forth.

2. In a machine for soldering the seams of can-bodies, the combination of the rotary carrier B, the split cylinder A, the clamping-knife C, the expanding-rod D, having different diameters, the handle E, attached to the rod D, and the arm G, by which the cylinder is expanded by the movement of the table.

In testimony whereof I affix my signature in presence of two witnesses.

WILLIAM H. H. STEVENSON.

Witnesses:
G. A. BOYDEN,
JNO. T. MADDOX.